(12) United States Patent
Martin

(10) Patent No.: US 11,397,867 B2
(45) Date of Patent: Jul. 26, 2022

(54) ARCHITECTURAL DATABASE TAG ASSEMBLY AND METHOD FOR INSTALLING ARCHITECTURAL DATABASE TAG ASSEMBLY

(71) Applicant: Stephen C. Martin, Houston, TX (US)

(72) Inventor: Stephen C. Martin, Houston, TX (US)

(*) Notice: Subject to any disclaimer, the term of this patent is extended or adjusted under 35 U.S.C. 154(b) by 16 days.

(21) Appl. No.: 17/028,553

(22) Filed: Sep. 22, 2020

(65) Prior Publication Data
US 2021/0089735 A1    Mar. 25, 2021

Related U.S. Application Data

(60) Provisional application No. 62/904,304, filed on Sep. 23, 2019.

(51) Int. Cl.
| | |
|---|---|
| *G06F 17/00* | (2019.01) |
| *G06K 7/08* | (2006.01) |
| *G06K 19/06* | (2006.01) |
| *G06K 7/14* | (2006.01) |
| *G06F 16/9038* | (2019.01) |
| *G06F 16/9035* | (2019.01) |
| *G06F 16/901* | (2019.01) |

(52) U.S. Cl.
CPC ........... *G06K 7/143* (2013.01); *G06F 16/901* (2019.01); *G06F 16/9035* (2019.01); *G06F 16/9038* (2019.01); *G06K 19/06037* (2013.01)

(58) Field of Classification Search
CPC ......... G06K 7/143; G06K 19/06037; G06F 16/901; G06F 16/9035; G06F 16/9038; G06F 16/9554

USPC ................................................ 235/451, 492
See application file for complete search history.

(56) References Cited

U.S. PATENT DOCUMENTS

| | | |
|---|---|---|
| 5,278,885 A | 1/1994 | Davis et al. |
| 5,951,809 A | 9/1999 | Jenkins et al. |
| 6,185,471 B1 | 2/2001 | Sturdivant |
| 8,284,028 B2 | 10/2012 | Jeppesen |
| 8,995,757 B1 | 3/2015 | Ciarcia et al. |
| 10,667,328 B1* | 5/2020 | Lewis .................... H04W 84/18 |
| 2007/0198231 A1* | 8/2007 | Walch ................ G06Q 30/0283 |
| | | 703/1 |

(Continued)

*Primary Examiner* — Tuyen K Vo
(74) *Attorney, Agent, or Firm* — Matthews, Lawson, McCutcheon & Joseph, PLLC

(57) ABSTRACT

An architectural database tag assembly includes an architectural database tag containing indicia related to information about architecture of the building; and a membrane for attaching the architectural database tag to a surface of the building. Another architectural database tag assembly includes a tubular member comprising a central bore extending along an axis of the tubular member, and comprising a top surface, bottom surface, and at least one side surface between the top surface and the bottom surface; an architectural database tag to be attached to the top surface of the tubular member, the architectural database tag containing indicia related to information about architecture of the building; and a membrane for attaching the bottom surface of the tubular member to a surface of the building. The architectural database tag provides vital information about the architecture of a building, and is readily accessible and readable by persons seeking such information.

10 Claims, 6 Drawing Sheets

(56) References Cited

U.S. PATENT DOCUMENTS

| | | | |
|---|---|---|---|
| 2009/0058648 A1* | 3/2009 | Tuttle | G08B 7/062 |
| | | | 340/572.1 |
| 2009/0072978 A1* | 3/2009 | Tilson, Jr. | B28B 23/0031 |
| | | | 340/572.9 |
| 2010/0045439 A1* | 2/2010 | Tak | H04Q 9/00 |
| | | | 340/10.1 |
| 2013/0299569 A1* | 11/2013 | Gentile | G06Q 10/08 |
| | | | 235/375 |
| 2017/0238070 A1* | 8/2017 | Mantese | H04Q 1/116 |
| | | | 455/66.1 |
| 2019/0172161 A1* | 6/2019 | Conboy | G06Q 10/0875 |

* cited by examiner

ARCHITECTURAL DATABASE TAG ASSEMBLY AND METHOD FOR INSTALLING ARCHITECTURAL DATABASE TAG ASSEMBLY

CROSS REFERENCE TO RELATED APPLICATIONS

This application is a non-provisional application that claims priority to U.S. Provisional Application No. 62/904,304, entitled "Roof Tag and Process for Installing Such Roof Tag", filed on Sep. 23, 2019. The disclosure of the prior application is hereby incorporated by reference herein in its entirety.

FIELD

The present invention relates to an architectural database tag assembly. In particular, the present invention relates to an architectural database tag assembly that includes an architectural database tag containing vital information about the architecture of a building, and that is readily accessible and readable by persons seeking such information. More particularly, the present invention relates to an architectural database tag assembly including the architectural database tag that has a simple construction, is easy to install, and is easy to find on the building.

BACKGROUND

In recent years, the construction of buildings, both commercial and residential, has increased dramatically. This increased construction spawns a corresponding rise in the need for verifying construction products, such as the materials for constructing the roof of a building.

As building purchasers become increasingly concerned with quality and workmanship, product warranties providing guarantees of quality and workmanship are in greater demand. Because contractors cannot directly control the material quality, they must rely on warranties offered by construction product manufacturers. Should any of these materials fail subsequent to construction, the building owner as well as the contractor must determine the source of the material. The manufacturer of the material must also be able to confirm that it is indeed the source of the defective material, as such identification is essential in the determination of liability for breach of warranty upon failure of the building materials. Such failure or breach of warranty may also give rise to product liability litigation should the failure resulted in injury to person or property. In this situation as well, correct determination of liability requires a means for identifying the manufacturer.

For example, each roofing system of a building has particular information associated with the roofing materials. These items include such things as the roof deck composition, the insulation R-value (i.e. thickness), and the roofing chemical composition. This information can allow repairs in the future to be made with similar materials. However, most roof roofing systems installed do not have any identifying marks on the roof. For instance, there is no information that indicates the identity of the installing contractor and/or manufacturers of the roof assembly. This deficiency requires building orders to rely on, for instance, paper backups. Often, these paper backups are lost in the sale of the property or during a change of management. This puts increased costs on building owners in that the building owners will not know who to call for repairs. Also, building owners will not be aware of whether or not a roofing warranty from the manufacturer is still valid. It should be noted that some warranties last thirty years and upwards of fifty years, and insurance companies want proof of the age of a roof.

With roof coatings now entering the marketplace, the inability to know the chemical makeup of the roof coating chemistry prevents a contractor or building owner from being able to make sustainable long-term repairs. Certain coatings may adhere one day and peel off the next day. Ultimately, improper roof coatings can respond negatively to thermal events. As such, it is important to know the chemical composition of such roof coatings. From an insurance perspective, when there is no information about the particular construction of a building's roof, insurance adjusters are not able to know the combined layers of a roofing assembly in order to adjust for its replacement.

In view of the foregoing, some techniques have been developed to allow persons to properly know the various components and origins of the roofing system that is applied to their building.

For instance, various patents have issued with respect to roofing marking systems. U.S. Pat. No. 5,278,885, issued on Jan. 11, 1994 to Davis et al., describes a rubber product identification system using tagging. In particular, this patent describes a method for positive product identification using tagging materials, such as barium sulfate, manganese dioxide or mixtures thereof. These materials are employed as a dusting agent used in roofing materials and applied to one or both sides of the rubber roofing sheeting or admixed with the compounding ingredients during the preparation of the sheeting composition. The tagging materials can be detected and identified in the finished product by X-ray fluorescence spectroscopy.

U.S. Pat. No. 5,951,809, issued on Sep. 14, 1999 to Jenkins et al., discloses a method of providing identifying indicia to a roofing shingle. A composition roofing shingle is described which has a release material affixed thereto for the purpose of identifying the compositional shingle with process parameters for the time frame of manufacture. The identification is achieved by a marking the release material with planographic indicia by means of printing, stamping and ink-jet spray application.

U.S. Pat. No. 6,185,471, issued on Feb. 6, 2001 to D. H. Sturdivant, teaches a method for labeling roofing shingles using binary coding. This labeling provides information as to the location, date and shift of manufacture of roofing shingles. This information is cut into an edge of the shingles as a coded sequence of slits. The slit sequence is coded using a binary coding scheme, with a separate binary number group defining each of the shift, the month, the day, and the year of manufacture. Plant information is also provided.

U.S. Pat. No. 8,284,028, issued on Oct. 9, 2002 to H. R. Jeppesen, shows a method of manufacturing an identifiable roofing product. This method includes the steps of providing a first layer of material, providing a second layer material onto the first layer material, and arranging an RFID tag onto the first layer of material prior to providing the second layer of material.

U.S. Pat. No. 8,995,757, issued on Mar. 31, 2015 to Ciarcia et al., discloses an automated roof identification system. This is a roof estimation system configured to automatically detect a roof and a target image of a building having a roof. One or more artificial intelligence systems are trained to identify likely roof sections of an image. The artificial intelligence system is also trained on historical image data or on an operator-specified region of interest within the target image.

A need exists, in the building industry, for a durable architectural database tag that provides vital information about the architecture of a building, and that is readily accessible and readable by persons seeking such information. This architectural information may include, among other things about the building, roof deck composition, insulation R-value, and roof coating chemical composition, construction materials, warranty information, repair information, original blueprints and specifications, and contractor information. A need also exists, in the building industry, for an architectural database tag assembly that includes the architectural database tag, has a simple construction, is easy to install, and is easy to find on the building.

The embodiments discussed below meet these needs.

SUMMARY

One object of the present disclosure is to provide an architectural database tag that provides vital information about the architecture of a building, and that is readily accessible and readable by persons seeking such information. This architectural information may include, among other things about the building, roof deck composition, insulation R-value, and roof coating chemical composition, construction materials, warranty information, repair information, original blueprints and specifications, and contractor information.

Another object the present disclosure is to provide an architectural database tag assembly including the architectural database tag, and that has a simple construction, is easy to install, and is easy to find on the building. The architectural database tag may provide the ability for future repairs to be of similar materials, may allow a determination of whether or not a warranty on a part(s) of a building is still in force, may allow a person to access the original blueprints and building specifications, and may allow the original installing contractor to be called in the event of the need for repairs.

Still another object of the present disclosure is to provide an architectural database tag that is scannable with a cell phone in order to obtain the architectural information discussed herein.

A further object of the present disclosure is to provide a method of attaching an architectural database tag to a building in a relatively simple manner so that the architectural database tag is easy to find on the building.

In an embodiment, an architectural database tag assembly for attaching an architectural database tag to a building comprises: the architectural database tag, the architectural database tag containing indicia related to information about architecture of the building; and a membrane for attaching the architectural database tag to a surface of the building.

In an embodiment, the architectural database tag is formed of stainless steel.

In an embodiment, the indicia are a laser-engraved indicia on a surface of the architectural database tag.

In an embodiment, wherein the laser-engraved indicia comprise a QR-code configured to provide information about the architecture of the building when the QR-code is scanned.

In an embodiment, the membrane is configured to attach the architectural database tag to the surface of the building via hot-air welding.

In an embodiment, wherein the membrane comprises a cut-out, and the indicia on the architectural database tag are exposed through the cut-out when the architectural database tag is attached to the surface of the building by the membrane.

In an embodiment, the assembly further comprises an intermediate member, wherein the intermediate member comprises a top surface, bottom surface, and at least one side surface between the top surface and the bottom surface, the architectural database tag is attached to the top surface of the intermediate member, and the membrane attaches the bottom surface of the intermediate member to the surface of the building.

In an embodiment, the intermediate member is tubular shaped and comprises a central bore extending along an axis of the intermediate member.

In an embodiment, at least a portion of the membrane extends at least partially into the central bore to attach the bottom surface of the intermediate member to the surface of the building.

In another embodiment, an architectural database tag assembly comprises a tubular member comprising a central bore extending along an axis of the tubular member, and comprising a top surface, bottom surface, and at least one side surface between the top surface and the bottom surface; an architectural database tag to be attached to the top surface of the tubular member, the architectural database tag containing indicia related to information about architecture of a building; and a membrane for attaching the bottom surface of the tubular member to a surface of the building.

In an embodiment, at least a portion of the membrane extends at least partially into the central bore to attach the bottom surface of the intermediate member to the surface of the building.

In an embodiment, the membrane is configured to attach the tubular member to the surface of the building via hot-air welding.

In an embodiment, the architectural database tag is formed of stainless steel, and the indicia are a laser-engraved indicia on a surface of the architectural database tag.

In an embodiment, the laser-engraved indicia comprise a QR-code configured to provide information about the architecture of the building when the QR-code is scanned.

In another embodiment, a method of attaching an architectural database tag to a building comprises providing an architectural database tag containing indicia related to information about architecture of the building; and attaching the architectural database tag to a surface of the building via a membrane.

In an embodiment, the surface of the building is a roof shingle on a pitched roof of the building, and the method further comprises providing another shingle on the pitched roof to only partially cover the architectural database tag so that a portion of the architectural database tag that is not covered by the another shingle includes the indicia and is exposed.

In an embodiment, the membrane comprises a cut-out, and the indicia on the architectural database tag are exposed through the cut-out when the architectural database tag is attached to the surface of the building by the membrane.

In an embodiment, the architectural database tag is attached to the surface of the building via hot-air welding the membrane to the surface.

In an embodiment, the method further comprises: providing an intermediate member comprising a top surface, bottom surface, and at least one side surface between the top surface and the bottom surface; attaching the architectural database tag to the top surface of the intermediate member;

and attaching the bottom surface of the intermediate member to the surface of the building via the membrane.

In an embodiment, the surface of the building is one of a roof, a chimney, and an electrical panel of the building.

BRIEF DESCRIPTION OF THE DRAWINGS

In the detailed description of various embodiments usable within the scope of the present disclosure, presented below, reference is made to the accompanying drawings, in which.

One or more embodiments are described below with reference to the listed FIGS.

DETAILED DESCRIPTION

Before describing selected embodiments of the present disclosure in detail, it is to be understood that the present invention is not limited to the particular embodiments described herein. The disclosure and description herein is illustrative and explanatory of one or more presently preferred embodiments and variations thereof, and it will be appreciated by those skilled in the art that various changes in the design, organization, means of operation, structures and location, methodology, and use of mechanical equivalents may be made without departing from the spirit of the invention.

As well, it should be understood that the drawings are intended to illustrate and plainly disclose presently preferred embodiments to one of skill in the art, but are not intended to be manufacturing level drawings or renditions of final products and may include simplified conceptual views to facilitate understanding or explanation. As well, the relative size and arrangement of the components may differ from that shown and still operate within the spirit of the invention.

Moreover, it will be understood that various directions such as "upper", "lower", "bottom", "top", "left", "right", and so forth are made only with respect to explanation in conjunction with the drawings, and that components may be oriented differently, for instance, during transportation and manufacturing as well as operation. Because many varying and different embodiments may be made within the scope of the concept(s) herein taught, and because many modifications may be made in the embodiments described herein, it is to be understood that the details herein are to be interpreted as illustrative and non-limiting.

Figure 1:
FIG. 1 is a plan view of an architectural database tag according to an embodiment.

FIG. 1 shows an architectural database tag 10 according to an embodiment. The architectural database tag 10 may include a stainless steel panel 12, and the stainless steel panel 12 may be corrosion resistant. The material of the architectural database tag 10 is not limited to stainless steel. In other embodiments, the architectural database tag 10 may be formed of zinc, copper, aluminum, or other non-ferrous metals, in order to inhibit rust and corrosion of the architectural database tag 10. Still in further embodiments, the architectural database tag 10 may be formed of the same material as other parts of the building. The architectural database tag 10 may have a generally square or rectangular shape, and the back side of the architectural database tag 10 may be flat. However, other polygonal shapes for the architectural database tag 10 are within the scope of the present disclosure. By way of example, the size of the architectural database tag 10 may be 4 inches by 4 inches, but the architectural database tag 10 is not limited to any particular size. The architectural database tag 10 should be of a size to include various indicia formed on the front surface 14 of the architectural database tag 10. In a preferred embodiment, the indicia on the front surface 14 of the architectural database tag 10 may be laser engraved so as to have, for example, a 100 year military grade specification life. The laser engraving is an improvement over the prior art that used paint on labels and tags that would easily fade after a few years of being exposed to the elements. In other embodiments, the indicia may be engraved by removing portions of the front surface 14 with a drill, cutting device, or router bits such as used in the jewelry industry. The indicia may include such things as, but not limited to, a QR-code, an installer's name and address, an installer's phone number, an installer's website, a date that a building component (such as a roof) was installed, and/or other information.

In the embodiment shown in FIG. 1, the indicia on the front surface 14 of the architectural database tag 10 includes a QR-code 16 that is scannable with a cell phone, so as to provide the cell phone's user with a variety of information about the architecture of the building. The "information about architecture of the building" is used herein to include all of the building construction information that can be found in the 50 Divisions of construction information as defined by the Construction Specifications Institute (CSI). These include: Procurement and Contracting Requirements; General Requirements; Existing Conditions; Concrete; Masonry; Metals; Wood, Plastics, and Composites; Thermal and Moisture Protection; Openings; Finishes; Specialties; Equipment; Furnishings; Special Construction; Conveying Equipment; Mechanical Support; Fire Suppression; Plumbing; Heating Ventilating and Air Conditioning; Integrated Automation; Electrical; Communications; Electronic Safety and Security; Earthwork; Exterior Improvements; Utilities; Transportation; Waterways and Marine Construction; Process Interconnections; Material Processing and Handling Equipment; Process Heating, Cooling, and Drying Equipment; Process Gas and Liquid Handling, Purification and Storage Equipment; Pollution Control Equipment; Industry-Specific Manufacturing Equipment; Water and Wastewater Equipment; and Electrical Power Generation. A person accessing the architecture information of the building via the indicia may obtain information within the above divisions, including the composition information of the building (such as roof deck composition), an insulation R-value of the building roof, a roof chemical composition, the name and address of the manufacturer, the dimensions of the building component (such as the roof), and a link(s) to other building components of the building process, such as blue prints, permits, original building materials, original building specifications, proofs of sale, warranty information, locations of electrical and water lines, and other constructions documents.

For instance, the QR-code 16 on the front surface 14 of the architectural database tag 10 may be scanned and the information returned in the cell phone for later viewing or downloading for transfer to another location or user. The QR-code 16 can include, among other things, information pertaining to the installer's name and address, the installer's phone number, the installer's website, the date installed, the roof deck composition, the insulation R-value, the roof chemical composition, warranty information, the name and address of the shingle manufacturer, shingle dimensions, and other information about the roof or building within the 50 Divisions of construction information as defined by the Construction Specifications Institute (CSI). In the illustrated embodiment, a phone number 18 relating to warranty information is provided on the front surface 14 of the architectural database tag 10. A contact website 20 may also be provided on the front surface 14 so that persons can be contacted with respect to, for instance, warranty information, original blueprints and building specifications. For example, architects can request a purchase price for control documents on the website, and can determine whether those documents contain a copyright. By scanning the QR-code 16 or by accessing the telephone number 18, an insurance adjuster, building owner, contractor, or homeowner can simply and easily obtain all the vital information about the building, such as its roof, from the cell phone. The architectural database tag 10 may include a serial number specific to the building to which it is attached, so that the architectural database tag 10 remains with the building address until the building no longer exists. The originating contractor, architect or insurance company or persons can enter the serial number so as to upload warranty information. Also, the serial number can be entered on a computer or handheld device so that a service can transmit back to the computer or handheld device all of the controlled documents, including the original blueprints and building specifications, etc.

Figure 2:
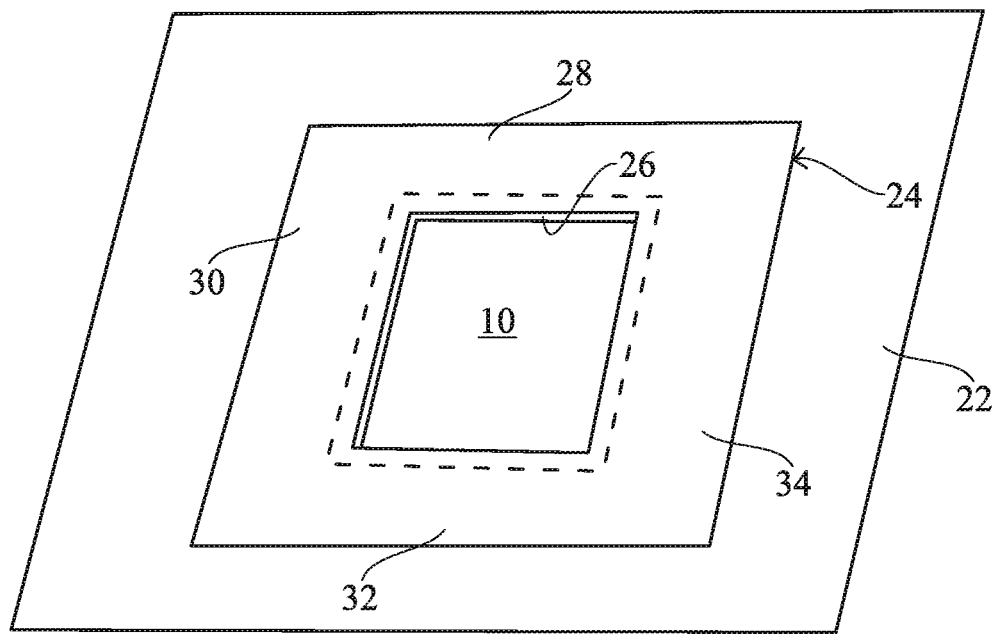
FIG. 2 is a perspective view showing one embodiment of an architectural database tag assembly on a surface of a building.

The architectural database tag 10 may be part of an architectural database tag assembly for attaching the architectural database tag 10 to a surface of a building. The architectural database tag assembly may include the architectural database tag 10 and a membrane 24 for attaching the architectural database tag 10 to a surface 22 of the building. FIG. 2 shows the installation of the architectural database tag 10 upon the surface 22 of a building via the membrane 24. The building surface 22 may be a shingle, or other part of the roof of the building. Alternatively, the architectural database tag 10 can be installed onto a roof access ladder instead of a shingle, or on the electrical box of the building, or on the chimney of the building. The material of the membrane 24 is not particularly limited, and in some embodiments may be formed of a polyvinyl chloride (PVC), thermoplastic polyolefin (TPO), or ethylene propylene diene terpolymer (EPDM). In other embodiments, the membrane 24 may be formed of adhesive material, or a glue-based material. When the membrane 24 is formed of a glue-based material, it may be beneficial to form the underside of the architectural database tag 10 with small grooves, such as by grinding the underside (i.e., the bottom surface) of the architectural database tag 10, to provide a better grip of architectural database tag 10 to the glue-based material. The membrane 24 may have outer dimensions greater than those of the architectural database tag 10 so that the perimeter of the membrane 24 extends beyond that of the architectural database tag 10 as shown in FIG. 2. The membrane 24 may have a cutout 26. The cutout 26 may have dimensions less than the dimensions of the architectural database tag 10 so that the perimeter of the architectural database tag 10 extends beyond the inside perimeter of the cutout 26 as shown in FIG. 2. The cutout 26 allows the indicia on the architectural database tag 10 to be exposed through the interior of the cutout 26 when the membrane 24 is applied to the architectural database tag 10 to attach the architectural database tag 10 to the surface 22. The cutout 26 may be generally rectangular or square. As shown in FIG. 2, the membrane 24 has surfaces 28, 30, 32 and 34 that extend outwardly away from the architectural database tag 10. As such, the membrane 24 will overlie the architectural database tag 10 and the edges of the architectural database tag 10 proximate the cutout 26 to retain the edges of the architectural database tag 10 therein. In an embodiment, the surfaces 28, 30, 32 and 34 of the membrane 24 can be hot-air welded to the surface 22. In other embodiments, the membrane 24 can be glued into place on the surface 22, or may be attached to the surface 22 with double-sided adhesive tape.

Figure 3:
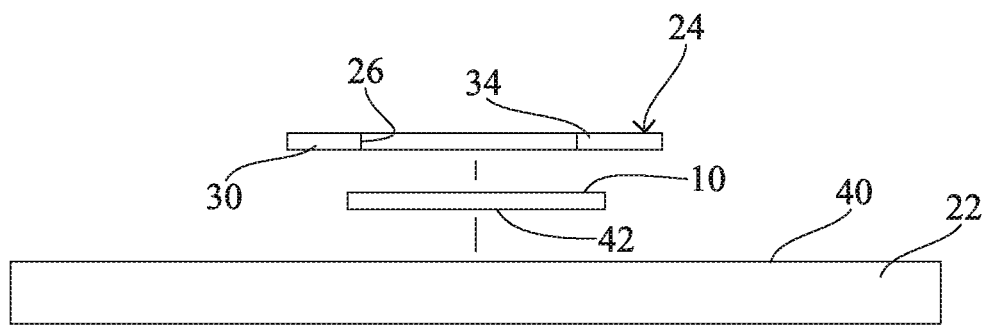
FIG. 3 is an exploded side view showing the architectural database tag assembly and building surface of FIG. 2.

FIG. 3 is an exploded view showing the configuration of the architectural database tag assembly shown in FIG. 2, according to an embodiment. In particular, FIG. 3 shows the surface 22 of a building. The surface may be a roof shingle, a roof access ladder, or in some cases an electrical box, or a chimney of the building. The surface 22 has an outer surface 40 upon which the architectural database tag 10 is attached. The architectural database tag 10 is positioned so as to have a bottom surface 42 of the architectural database tag 10 facing the top surface 40 of the building surface 22. The membrane 24 is located above the architectural database tag 10. The FIG. 3 view shows the surfaces 30 and 34 of the membrane 24 extending outwardly beyond the periphery of the architectural database tag 10. As such, it can be seen that when the membrane 24 is lowered onto the architectural database tag 10, the bottom surface 42 of the architectural database tag 10 will bear against the top surface 40 of the building surface 22, and that the outwardly extending surfaces 30 and 34 of the membrane 24 will affix to the top surface 40 to securely retain the bottom surface 42 of the architectural database tag 10 against the building surface 22. Meanwhile, the indicia on the architectural database tag 10 are exposed through the interior of the cutout 26 when the membrane 24 is applied to the architectural database tag 10 (as shown in FIG. 2).

Figure 4:
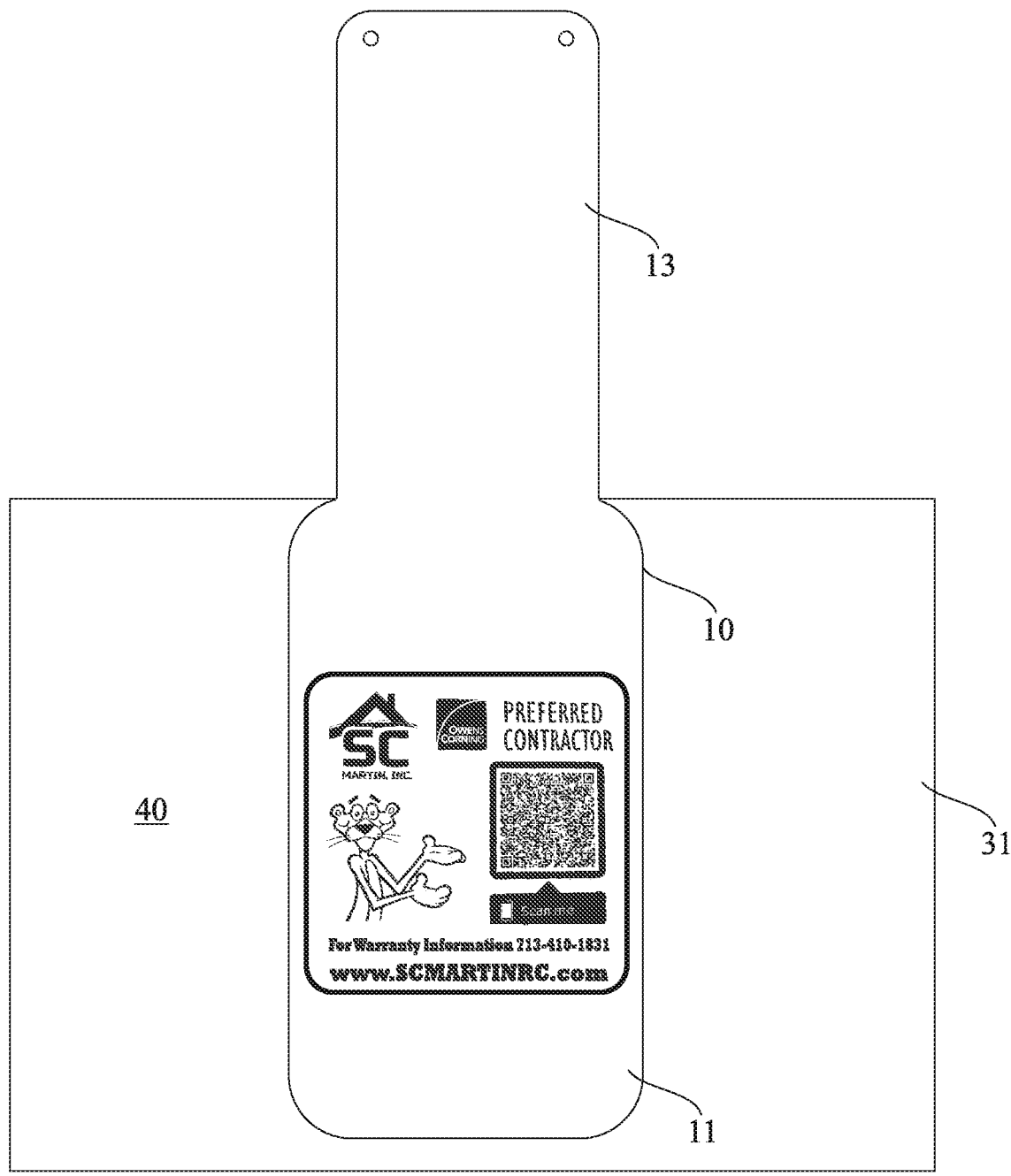
FIG. 4 is a perspective view showing installation of an architectural database tag assembly on a pitched roof of a building according to another embodiment.
Figure 5:
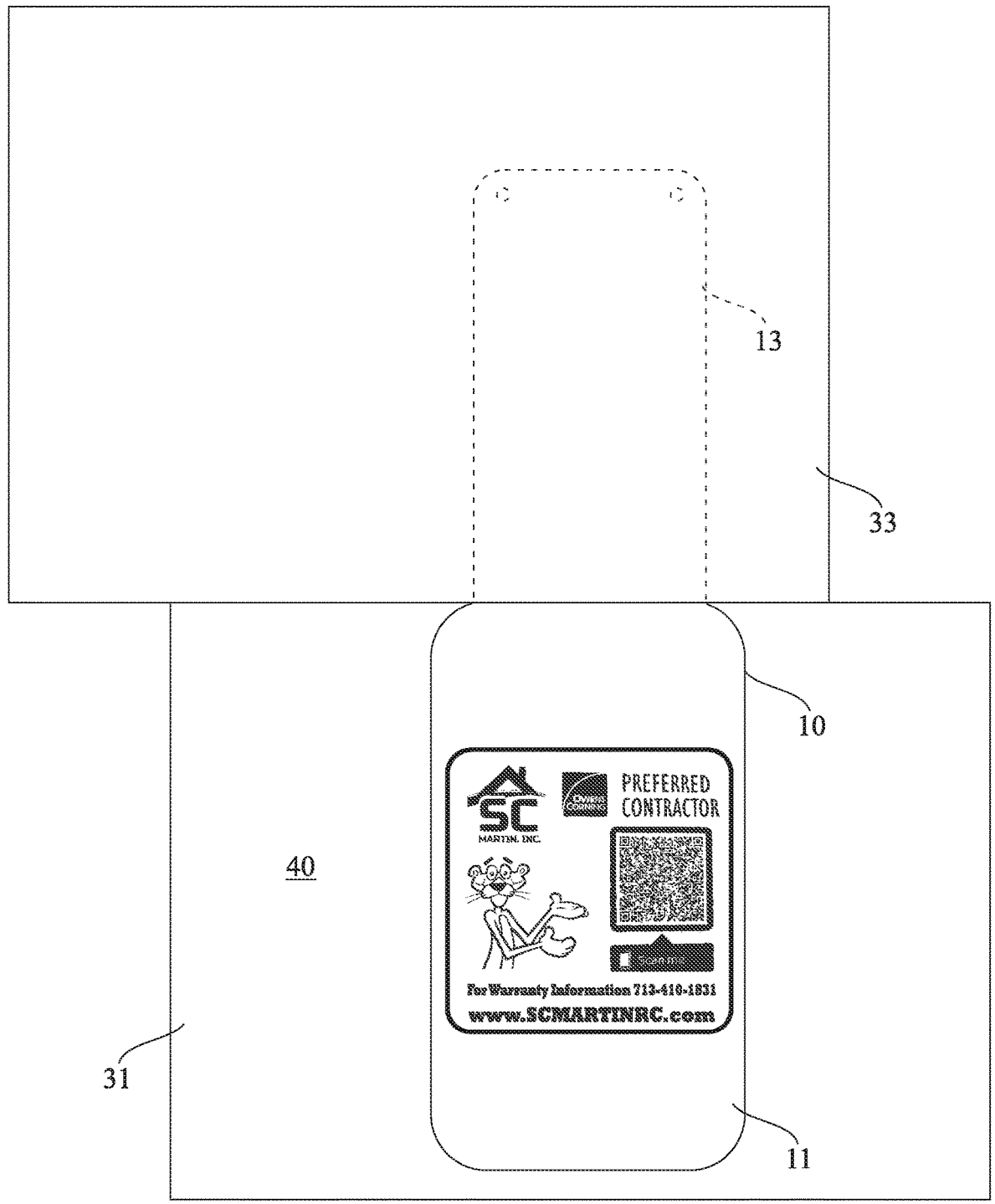
FIG. 5 is a perspective view showing the completed installation of the architectural database tag assembly on the pitched roof of FIG. 4.

The embodiment illustrated in FIGS. 2 and 3 may be applicable to flat or low slope surfaces of a building. In another embodiment of the present disclosure, the architectural database tag assembly may be used on a pitched roof as shown in FIGS. 4 and 5. In such a case, the architectural database tag 10 may be attached between the layers of the roofing assembly for attachment. For example, the architectural database tag 10 may have a shape that includes a base 11 having the indicia, and a neck portion 13 above the base 11 as shown in FIG. 4. The base 11 (other than the neck portion 13) of the architectural database tag 10 may be attached to the top surface 40 of a roof shingle 31 on a pitched roof via glue, or the membrane 24 (not shown in FIGS. 4 and 5) in the manner discussed above. As shown in FIG. 5, another shingle 33 (e.g., adjacent ridge shingle) is provided to the pitched roof at a higher elevation than the attached architectural database tag 10 and over the neck portion 13 to only partially cover the attached architectural database tag 10 and leave the indicia on the installed architectural database tag 10 exposed on the surface 40 of the initial roof shingle 31. In this way, only a portion of the architectural database tag 10 (i.e., the base 11 with the indicia) can be visible to the building owner from the ground, but highly visible to, e.g., a contractor walking on the roofing system in order to perform repairs. This configuration allows the installed architectural database tag 10 to be waterproofed, such that water running down the pitched roof will flow down from the another (e.g., adjacent) roof shingle 33 onto the initial roof shingle 31 having the installed architectural database tag 10 without travelling between the bottom surface 42 of the architectural database tag 10 and the top surface 40 of the roof shingle 31.

In further embodiments, the architectural database tag assembly may be used to attach the architectural database tag 10 to a building surface of asphalt, tile, concrete, metal or wood.

In another embodiment, the architectural database tag assembly may be used to attach the architectural database tag 10 to a main electrical service panel inside or outside of the building. This may be in addition to applying the architectural database tag 10 on the roof of the building. A benefit of attaching the architectural database tag 10 to the main electrical service panel of the building is that the architectural information referenced by the architectural database tag 10 is preserved and not lost in the case that the roof having the architectural database tag 10 is destroyed by fire or natural disaster. The use of the architectural database tag 10 on the electrical service panel can be used as a reference. Further, the architectural database tag 10 may also be applied to the roof access ladder, adhered to the back of the chimney (outside the view of the resident), or installed on top of the heater vent on pitched roofs (also outside the view of the resident). In some embodiments, the architectural database tag 10 may be attached to multiple locations on the building, e.g., on the roof, on the roof access ladder, on the chimney, on the electrical box, and/or on the heater vent.

In some embodiments, the architectural database tag 10 may be attached to strategic locations on the roof of a building so as to be easily found by a person looking for the architectural database tag 10. For example, the architectural database tag 10 may be attached to the surface 22 of the roof at the top-center of the roof and on the back side of the building. Another location may be the northeast corner of the roof (similar to that of a building cornerstone), or another location recognized in the industry as being standard.

Figure 7:
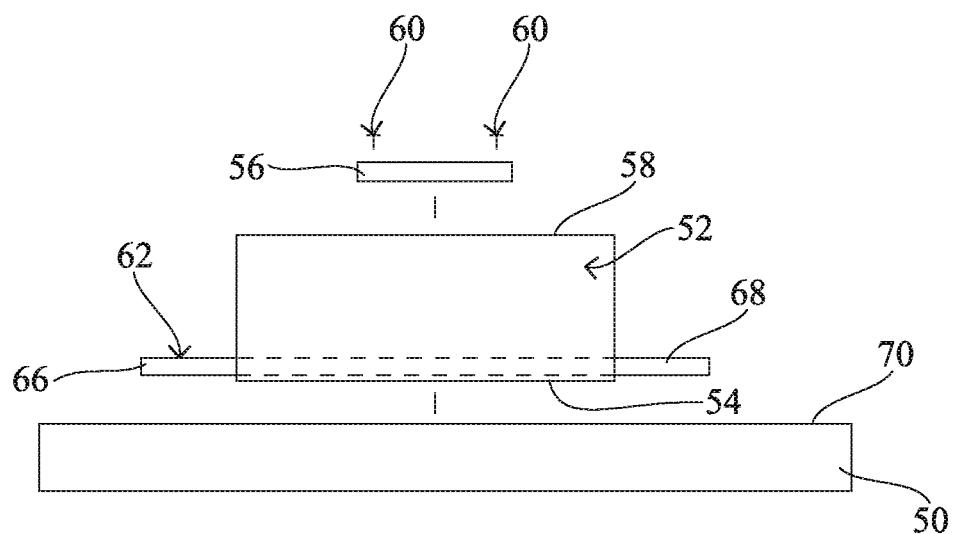
FIG. 7 is a side exploded view showing the architectural database tag assembly and building surface of FIG. 4.
Figure 8:
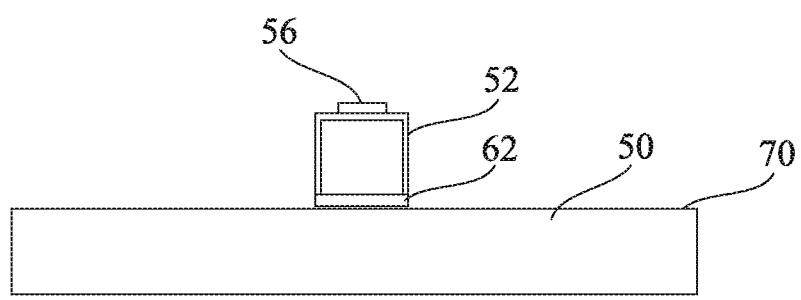
FIG. 8 is an end view showing the architectural database tag assembly in accordance with the alternative embodiment of FIG. 4.

Under certain circumstances, soot, grime, debris, and dirt can accumulate on the front surface of the architectural database tag 10. This may especially be the case with flat building surfaces, such as a flat roof of a building. Under such circumstances, the information on the architectural database tag 10 can be obscured. As such, the embodiment shown in FIGS. 6-8 is configured so as to avoid the accumulation of such materials and to keep the surface of the architectural database tag 10 relatively clean.

Figure 6:
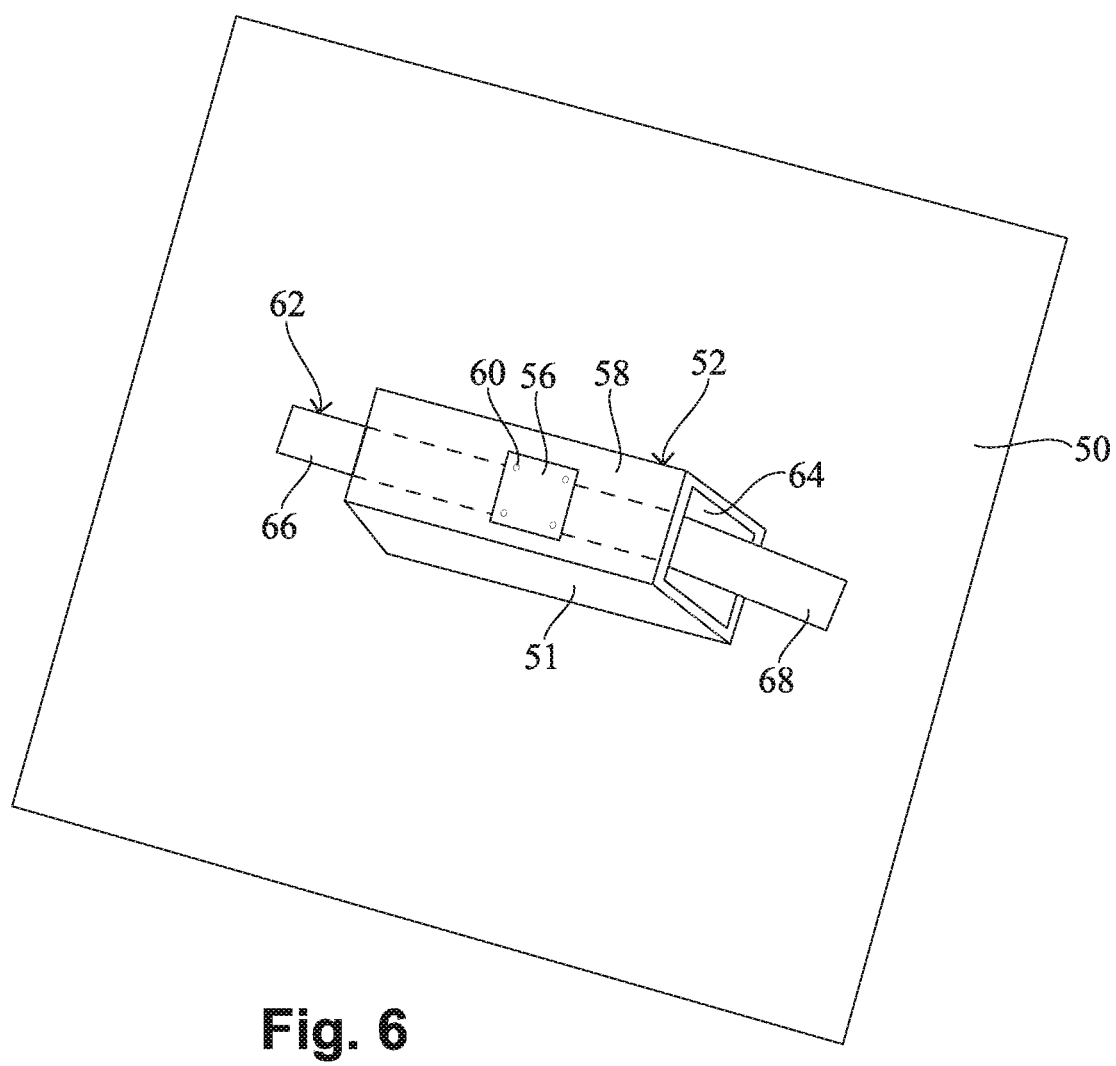
FIG. 6 is a perspective view of an alternative embodiment of an architectural database tag assembly on a surface of a building.

FIG. 6 shows that the architectural database tag assembly includes an intermediate member 52 provided between the architectural database tag 56 (which may be the same or similar to the architectural database tag 10 shown in FIG. 1) and the building surface 50. In an embodiment, the intermediate member 52 may be formed as a tubular member comprising a top surface 58, bottom surface 54 (see FIG. 7), and at least one side surface 51 between the top surface 58 and the bottom surface 54. The tubular shaped intermediate member 52 may include a central bore 64 or open interior extending along an axis of the intermediate member 52. In the illustrated embodiment, the intermediate member 52 may have a square tubular configuration. However, other polygonal shapes for the intermediate member 52 are within the scope of the present disclosure. For instance, the intermediate member 52 may have a trapezoidal tubular configuration, such that the architectural database tag 56 attached to an inclined top surface 58 of the intermediate member 52 may be at disposed at an angle. In this configuration, dirt and/or other debris does not accumulate on the surface of the architectural database tag 56. In the preferred embodiment, the intermediate member 52 may have a 5"×5"×6" (Height×Width×Length) size. Other smaller and larger sizes are within the scope of the present disclosure. In an embodiment, the intermediate member 52 may be powder coated with a safety red material so that the intermediate member 52 can stand and be easily seen on the building, such as on the roof of the building. Of course, the intermediate member 52 is not limited to any particular color, but should have a color that helps the intermediate member 52 stand out from the color of the building surface 50 or roof so that the intermediate member 52 is easily seen by persons looking for it. In an alternative embodiment, the intermediate member 52 may be brick-shaped (i.e., a solid block without a central bore 64 or interior space).

FIG. 6 illustrates that the architectural database tag 56 is attached to the intermediate member 52, and the intermediate member 52 is attached to the building surface 50 via a membrane 62. That is, the bottom surface 54 of the intermediate member 42 bears against the top surface 70 (see FIG. 7) of the building surface 50. The architectural database tag 56 may be affixed to the top surface 58 of the intermediate member 52 via, for example, rivets 60 that are inserted into the architectural database tag 56 to affix the architectural database tag 56 to the top surface 58 of the intermediate member 52. Of course, means other than rivets may be used to affix the architectural database tag 56 to the intermediate member 52, such as adhesives, welding, or other types of fasteners found in the roofing industry. In FIG. 6, the membrane 62 is illustrated as extending through the central bore 64 of the intermediate member 52. As discussed above, the membrane 62 may be formed of a polyvinyl chloride (PVC), thermoplastic polyolefin (TPO), or ethylene propylene diene terpolymer (EPDM). In other embodiments, the membrane 62 may be formed of adhesive material, or a glue-based material. When the membrane 62 is formed of a glue-based material, it may be beneficial to form the underside of the intermediate member 52 with small grooves, such as by grinding the underside (i.e., the bottom surface) of the intermediate member 52, to provide a better grip of intermediate member 52 to the glue-based material. The membrane 62 may have one end 66 thereof and an opposite end 68 thereof extending outwardly of the opposite ends of the intermediate member 52 when the membrane 62 attaches the intermediate member 52 to the building surface 50. The outwardly extending ends 66 and 68 of the membrane 62 can be bonded to the building surface 50 by hot-air welding, or by other means such as by gluing, or with double-sided adhesive tape. As such, the bottom surface 58 of the intermediate member 52 will bear against the building surface 50 while the architectural database tag 56 is prominently displayed upon the top surface 58 of the intermediate member 52.

Among other things, the intermediate member 52 helps the architectural database tag 56 stand out on the building surface 50 (such as a roof of the building). The intermediate member 52 and the affixed architectural database tag 56 may be located at the northeast corner of a building, similar to that of a building cornerstone. The intermediate member 52 may be positioned on a roof of a building away from an edge of the roof. As such, the architectural database tag 56 on the intermediate member 52 is supported a small distance above the top of the roof so that the architectural database tag 56 can be easily located when an inspection is necessary. Other locations on the building for the intermediate member 52 and the affixed architectural database tag 56 are within the scope of the present disclosure, so long as the location is meant to help the architectural database tag 56 stand out on the building surface 50 to be easily found by persons looking for the architectural database tag 56.

FIG. 7 is an exploded view showing the configuration of the architectural database tag assembly of FIG. 6. It can be seen in FIG. 7 that the building surface 50 is illustrated as having the top surface 70 thereon. The intermediate member 52 is illustrated as having the membrane 62 extending through the central bore 64 thereof. In the embodiment, ends 66 and 68 of the membrane 62 extend outwardly of the ends of the intermediate member 52. The architectural database tag 56 may be located on the top surface 58 of the intermediate member 52. The rivets 60 are illustrated as being inserted through the architectural database tag 56 so as to engage with the top surface 58 of the intermediate member 52. The intermediate member 52 may be provided on the building surface 50 so that the outwardly extending ends 66 and 68 of the membrane 62 can be hot-air welded, or affixed in a different manner, to the top surface 70 of the building surface 50.

FIG. 8 shows a side view of the completed assembly. It can be seen that the building surface 50 has the membrane 62 affixed thereto. The intermediate member 52 extends above the top surface 70 of the building surface 50. The architectural database tag 56 is displayed at a distance above the top surface 70 of the building surface 50.

In the embodiments discussed herein, the architectural database tag 10, 56 may be reusable, such that the architectural database tag 10, 56 may be detached from the surface 22 of the building or from the surface of the intermediate member 52 and applied to a new surface in the event that the surface 22 of the building, or the intermediate member 52), is completely replaced.

Several embodiments have been discussed herein. It is within the scope of the present invention that the embodiments discussed herein may be combined with each other. That is, one or more aspects of one or more embodiments discussed herein may be incorporated or combined with aspects of other embodiments discussed herein.

The foregoing disclosure and description are illustrative and explanatory. While various embodiments usable within the scope of the present disclosure have been described with emphasis, it should be understood that within the scope of the appended claims, the present invention can be practiced other than as specifically described herein.

What is claimed is:

1. An architectural database tag assembly, comprising:
  a tubular member comprising a central bore extending along an axis of the tubular member, and comprising a top surface, bottom surface, and at least one side surface between the top surface and the bottom surface;
  an architectural database tag to be attached to the top surface of the tubular member, the architectural database tag containing indicia related to information about architecture of a building; and
  a membrane for attaching the bottom surface of the tubular member to a surface of the building.

2. The architectural database tag assembly according to claim 1, wherein at least a portion of the membrane extends at least partially into the central bore to attach the bottom surface of the intermediate member to the surface of the building.

3. The architectural database tag assembly according to claim 1, wherein the membrane is configured to attach the tubular member to the surface of the building via hot-air welding.

4. The architectural database tag assembly according to claim 1, wherein the architectural database tag is formed of stainless steel, and the indicia are a laser-engraved indicia on a surface of the architectural database tag.

5. The architectural database tag assembly according to claim 4, wherein the laser-engraved indicia comprise a QR-code configured to provide information about the architecture of the building when the QR-code is scanned.

6. A method of attaching an architectural database tag to a building, comprising:
  providing an architectural database tag containing indicia related to information about architecture of the building; and
  attaching the architectural database tag to a roof shingle on a pitched roof of the building; and
  providing another shingle on the pitched roof to only partially cover the architectural database tag so that a portion of the architectural database tag that is not covered by the another shingle includes the indicia and is exposed.

7. The method according to claim 6, wherein the architectural database tag is attached to the roof shingle via a membrane, and wherein the membrane comprises a cut-out, and the indicia on the architectural database tag are exposed through the cut-out when the architectural database tag is attached to the building by the membrane.

8. The method according to claim 7, wherein the architectural database tag is attached to the building via hot-air welding the membrane to the building.

9. A method of attaching an architectural database tag to a building, comprising:
  providing an architectural database tag containing indicia related to information about architecture of the building;
  providing tubular member comprising a central bore extending along an axis of the tubular member, a top surface, bottom surface, and at least one side surface between the top surface and the bottom surface;
  attaching the architectural database tag to the top surface of the tubular member; and
  attaching the bottom surface of the tubular member to a surface of the building via a membrane.

10. The method according to claim 9, wherein the surface of the building is one of a roof, a chimney, and an electrical panel of the building.

\* \* \* \* \*